April 24, 1945.  W. ERNST ET AL  2,374,593
SOLENOID OPERATED VALVE
Filed April 1, 1942
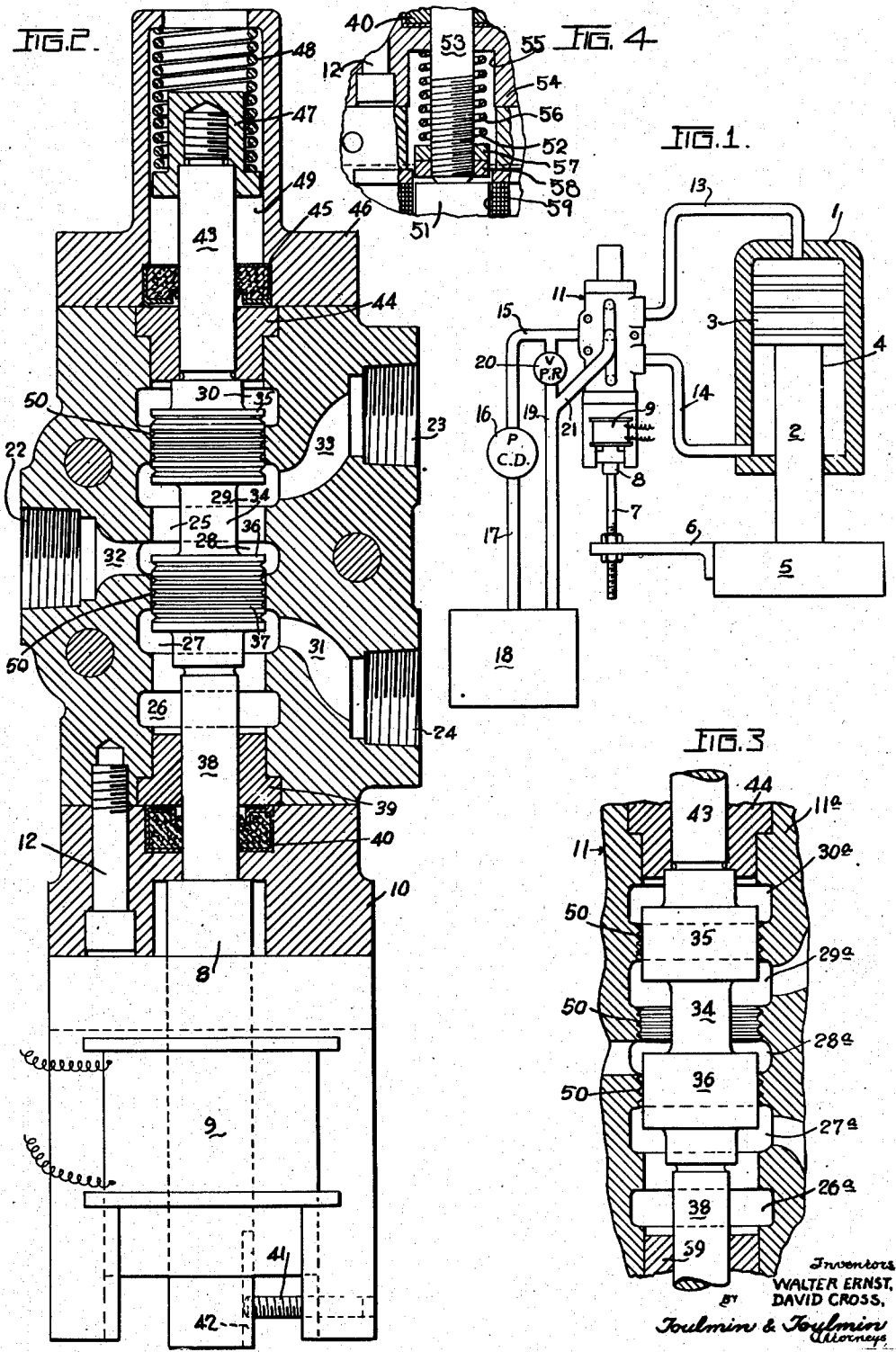
Inventors
WALTER ERNST,
DAVID CROSS,
BY Toulmin & Toulmin
Attorneys Patented Apr. 24, 1945

2,374,593

UNITED STATES PATENT OFFICE 2,374,593

SOLENOID OPERATED VALVE

Walter Ernst and David Cross, Mount Gilead, Ohio, assignors to The Hydraulic Development Corporation, Inc., Wilmington, Del., a corporation of Delaware Application April 1, 1942, Serial No. 437,302

2 Claims. (Cl. 121—46.5)

This invention relates to valves and, in particular, to solenoid operated valves.

Particularly in connection with press systems in which the supply of pressure fluid to the press cylinder is controlled by solenoid operated valves, it was necessary heretofore to provide a lever system having one end connected to the solenoid and the other end to the valve member in order to enable a relatively small solenoid to effect the desired movement of the valve member. Aside from the fact that such a lever system complicates the structure, it sometimes happens that the lever system breaks when the valve member encounters too great a resistance or sticks.

It is an object of this invention to provide an improved valve structure which will make it possible to eliminate the lever system heretofore provided for connecting the valve member with the solenoid actuating the latter.

It is another object of the invention to provide a valve structure comprising a reciprocable valve member in connection with a solenoid, in which the valve member is directly acted upon by the armature of the solenoid.

Still another object consists in the provision of a valve structure as set forth in the preceding paragraph in connection with a press in which the press ram has movably connected therewith an element adapted directly to actuate the armature of the solenoid so as to cause the latter to shift the valve into an intermediate or neutral position.

A further object of the invention consists in the provision of an improved valve structure comprising a reciprocable valve member in connection with a solenoid, in which the valve member is in alignment with the solenoid and operable thereby, while no positive connection is provided between the said solenoid and the said valve member.

These and other objects and advantages of the invention will appear more clearly from the following specification in connection with the accompanying drawing, in which:

Figure 1 diagrammatically illustrates a press circuit comprising the valve system according to the invention.

Figure 2 shows, partly in section, the improved valve system of the invention.

Figure 3 is a slight modification over the structure shown in Figure 2.

Figure 4 is a modification of a detail of Figure 2 for shortening the total length of the structure.

Referring to the drawing in detail, the press circuit according to Figure 1 comprises a press cylinder 1 having reciprocably mounted therein a ram 2 made up of a press piston 3 and piston rod 4. Connected with the piston rod 4 is a platen 5 with a platen arm 6 which has adjustably connected thereto a control rod 7.

The control rod 7 is adapted to engage and actuate the armature 8 of a solenoid 9, which is connected in any desired manner, for instance by screws or welding, to a collar 10, which, in its turn, is connected to the valve casing 11 in any desired manner, for instance by means of screws 12. The valve casing 11 is adapted to communicate through a conduit 13 with the upper portion of the press cylinder 1 and through a conduit 14 with the lower portion of the said press cylinder.

The conduit 15 is adapted to convey fluid from a pump 16 to the casing 11, while a conduit 17 establishes fluid connection between the fluid tank 18 and the suction side of the pump 16. Branching off from the conduit 15 is a conduit 19 comprising a pressure relief valve 20 and leading to the tank 18. The conduit 19 is adapted to communicate through conduit 21 with the valve casing 11.

As will be seen from Figure 2, the valve casing 11 comprises an inlet port 22 which is connected with conduit 15, and two ports 23, 24, of which the port 23 is connected with the conduit 13, while the port 24 is connected with the conduit 14.

The casing 11 is furthermore provided with a main bore 25 comprising a plurality of sections separated from each other by the annular chambers 26, 27, 28, 29 and 30. The chamber 27 communicates through a passageway 31 with the port 24, while the chamber 28 comunicates through a passageway 32 with the port 22. The chamber 29 communicates through a passageway 33 with the port 23. The chambers 26 and 30 communicate with the conduit 21.

Reciprocably mounted in the main bore 25 is a valve member, generally designated 34, which comprises two spaced pistons 35 and 36, each of which is provided with annular grooves 37. The valve member 34 has an extension 38 passing through a closure member 39 in the bore 25 and through an oil seal 40 arranged in the collar 10. The extension 38 abuts the armature 8 of the solenoid 9. Means, for instance a screw 41 engaging a groove 42 in the armature 8 is provided for preventing the armature 8 from accidentally leaving the solenoid 9.

The valve member 34 has a further extension 43 passing through a closure member 44 and an oil seal 45 in a cap 46 connected in any desired manner to the casing 11. The free end of the extension 43 is threaded into an abutment member 47 engaged by one end of the spring 48, the other end of which abuts the bottom of the cap 46. The abutment member 47 is reciprocable in the bore 49 of the cap 46.

The structure of Figure 3 substantially corresponds to that of Figure 2, with the exception that the annular grooves 37 in the pistons 35 and 36 are omitted, whereas annular grooves 50 are provided on the inside of the bore 25 between the chambers 27a, 28a, 29a and 30a. Inasmuch as otherwise the structure of Figure 3 corresponds to that of Figure 2, corresponding parts have been designated with the same reference numerals as in Figure 2, however, with the additional letter a.

Referring now to Figure 4, the same shows a portion of a slightly shorter armature 51 of a solenoid which otherwise substantially corresponds to the solenoid 9. The armature 51 is adapted to engage a threaded portion 52 of the valve shaft 53 which substantially corresponds to the valve shaft 38 of the valve shown in Figures 2 and 3.

As will also be clear from Figure 4, the collar 54 substantially corresponds to the collar 10 of Figure 2 and has a recess 55, the bottom portion of which is engaged by one end of a spring 56, while the other end of the spring engages an adjusting nut 57. The adjusting nut 57 is held in its position by means of a locking nut 58. The spring 56 continuously urges the shaft 53 and, thereby, the valve member 34 into its extreme lowermost position. When the valve of Figure 2 is modified according to Figure 4, the threaded portion 52 at the upper end of the extension 43, as well as the abutment member 47, the spring 48 and the cap 46 are superfluous and may be omitted. The oil seal 45 may then be held on the valve casing in any desired manner.

As will be clear, the modification of Figure 4 makes it possible to shorten the total length of the valve unit materially. If the spring 56 is to be adjusted, it is merely necessary to slightly withdraw the screws 41 and then to withdraw the armature 8, whereupon the nuts 57 and 58 may easily be adjusted by a wrench introduced through the solenoid bore 59.

The operation of the valve system according to the invention may best be described in connection with the circuit shown in Figure 1.

It may be assumed that it is desired to have the press system of Figure 1 perform a working cycle. To this end, the operator starts the pump 16 and, in any desired manner, energizes the solenoid 9. Energization of the solenoid 9 causes the armature 8 to move upwardly into the position shown in Figure 2, in which position fluid connection is established between the ports 22 and 23, while the port 24 communicates through chambers 27 and 26 with the conduit 21. Consequently, pressure fluid from the pump 16 is passed through the port 22 of the valve casing 11, chambers 28 and 29, port 23 and conduit 13 into the upper portion of the press cylinder 1, while fluid is expelled from beneath the piston 3 through the conduit 14, port 24, chambers 27 and 26 to the tank 18. As a result thereof, the ram 2 moves downwardly.

When the ram 2 reaches the end of its downward or working stroke, the solenoid 9 is deenergized, as is standard practice, whereupon the spring 48, which was previously compressed by the upward movement of the valve member 34, expands and moves the valve member 34 downwardly so that the extension 38 of the latter engages the armature 8 of the solenoid 9 and moves the said armature to its initial position. Now the port 24 communicates with the port 22, whereas the valve port 23 communicates through chamber 30 with the conduit 21. Consequently, pressure fluid from the pump 16 now passes through the valve ports 22 and 24 and through the conduit 14 into the lower portion of the press cylinder 1, while fluid expelled from the upper portion of the press cylinder 1 passes through conduit 13, valve port 23 and chamber 30 into the conduit 21 and from there to the tank 18. The ram 2, therefore, moves upwardly.

When the ram 2 approaches the end of its retraction stroke, the control rod 7, connected to the platen arm 6, engages the lower end of the armature 8 and moves the latter upwardly so that the pistons 35 and 36 close the passageways 31 and 33. Since, then, no fluid can escape from nor be supplied to the press cylinder 1, the ram 2 comes to a halt, while the pressure fluid delivered by the pump 16 is by-passed to the tank 18 through the pressure relief valve 20. The press is then ready for a new cycle.

As will be clear from the above, the valve system, according to the invention, has completely eliminated the lever system heretofore necessary for conveying the movement of the solenoid armature to the valve member. This advantageous structure has been materially favored by the grooves 37 in the pistons 35 and 36, or the grooves 50 in the bore 49, as shown in Figure 3, since these grooves virtually completely balance the pressure on all sides of the valve member and, thereby, facilitate the shifting movement thereof.

It will furthermore be noted that the armature acts as an intermediate or connecting link when, at the end of the retraction stroke, the platen arm 6 and control rod 7 connected thereto shift the valve into the intermediate or neutral position.

It will, of course, be clear that if the structure of Figure 2 is modified according to Figure 3 or Figure 4, such modification will not change the operation as described above.

It will be understood that we desire to comprehend within our invention such modifications as come within the scope of the claims.

Having thus fully described our invention, what we claim as new and desire to secure by Letters Patent, is:

1. In combination, a valve comprising a valve casing and a valve member reciprocably mounted in said casing, a solenoid armature arrangement in axial alignment with said valve and having one element thereof operable to directly engage and move said valve member into a first predetermined position, a spring casing associated with said valve casing, spring means mounted in said spring casing and interposed between said solenoid armature arrangement and an abutment near the adjacent end of said valve member for continuously urging said valve member into a second predetermined position, and adjusting means operated from the outside of said solenoid armature arrangement for adjusting the thrust of said spring means, said armature being removable to effect said adjustment.

2. In combination, a valve comprising a casing and a valve member reciprocably mounted in said casing, a solenoid connected to said casing, an armature controlled by said solenoid and operable to engage and move said valve member into a first predetermined position, yielding means mounted in said casing for biasing the valve in one direction and being located at and acting on the armature end of said valve member for continuously urging said valve member into a second predetermined position, and means operable from the outside of and through said solenoid for adjusting said yielding means without disconnecting said solenoid from said casing.

WALTER ERNST.
DAVID CROSS.